(12) United States Patent
Giesey et al.

(10) Patent No.: US 6,477,798 B1
(45) Date of Patent: Nov. 12, 2002

(54) SPARE TIRE LICENSE PLATE MOUNTING SYSTEM FOR A MOTOR VEHICLE

(75) Inventors: Jennifer L Giesey, Howell, MI (US); James S McMahan, White Lake, MI (US); Carl J Schultz, Redford Township, MI (US); Jeffrey M Niemi, Milford, MI (US); Robert P Langer, Warren, MI (US); David B Hansen, Grand Rapids, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 6 days.

(21) Appl. No.: 09/593,090

(22) Filed: Jun. 13, 2000

Related U.S. Application Data (60) Provisional application No. 60/175,541, filed on Jan. 11, 2000.

(51) Int. Cl.[7] ................................................ B62D 43/02
(52) U.S. Cl. ........................ 40/209; 296/37.3; 224/42.2
(58) Field of Search ................ 40/209, 59.1; 296/37.2, 296/37.3; 224/42.21, 42.2, 42.24, 42.25

(56) References Cited

U.S. PATENT DOCUMENTS

| | | |
|---|---|---|
| 1,244,417 A | 10/1917 | Brosman |
| 1,321,017 A | 11/1919 | Draver |
| 1,390,291 A | 9/1921 | Hill |
| 1,593,921 A | 7/1926 | Sutherland |
| 2,052,970 A * | 9/1936 | Erbeck ................ 224/42.21 X |
| 3,755,945 A | 9/1973 | McEwen et al. ............... 40/209 |
| 3,867,776 A | 2/1975 | Drummond et al. .......... 40/209 |
| 3,877,264 A | 4/1975 | Foglietti et al. ............... 70/237 |
| 3,905,637 A | 9/1975 | Smith .......................... 296/1 C |
| 3,915,491 A | 10/1975 | Montgomery ............... 296/1 C |
| 4,011,675 A | 3/1977 | Herring ........................ 40/209 |
| 4,257,642 A | 3/1981 | Sampson ..................... 296/1 C |
| 4,357,650 A | 11/1982 | Kano .......................... 362/234 |
| 4,406,490 A | 9/1983 | Torii et al. ................... 296/1 C |
| 4,413,803 A | 11/1983 | Ross ....................... 248/475 B |
| 4,537,437 A | 8/1985 | Buccola ...................... 296/1 C |
| 4,891,895 A | 1/1990 | DeLaquil, Jr. ............... 40/209 |
| 4,917,426 A | 4/1990 | Copp ......................... 293/142 |
| 5,012,602 A | 5/1991 | Storey ......................... 40/201 |
| 5,156,455 A | 10/1992 | Kuo ........................... 362/83.2 |
| 5,568,136 A | 10/1996 | Hochstein et al. ........... 340/903 |
| 5,608,391 A | 3/1997 | Bantli et al. ................. 340/933 |
| 5,657,008 A | 8/1997 | Bantli ......................... 340/933 |
| D389,438 S | 1/1998 | Guichard et al. ............. D12/98 |
| 5,815,955 A | 10/1998 | de Greeve ................... 40/209 |
| 5,870,841 A | 2/1999 | Brody, II et al. ............. 40/200 |
| 5,921,449 A | 7/1999 | Saegusa et al. ............ 224/42.2 |
| 6,003,922 A * | 12/1999 | Giesey et al. ............... 296/37.3 |
| 6,098,855 A * | 8/2000 | Grabowski et al. ........ 224/42.2 |

FOREIGN PATENT DOCUMENTS

JP               11192900 A   *   7/1999

* cited by examiner

*Primary Examiner*—D. Glenn Dayoan
*Assistant Examiner*—Jason Morrow
(74) *Attorney, Agent, or Firm*—Ralph E. Smith

(57) ABSTRACT

An apparatus for mounting a license plate to a motor vehicle having a spare tire mounted to a rear panel. The apparatus includes a mounting portion, a display portion and a latch assembly. The mounting portion is adapted to be pivotally interconnected to the motor vehicle for rotation about a pivot axis to selectively provide access to the spare tire. The display portion is carried by the mounting portion and is adapted to be oriented in a substantially vertical plane and spaced apart from a rear surface of the motor vehicle such that the spare tire is mounted to the motor vehicle interbetween the rear surface and the display portion. The latch assembly is operative for releasing/engaging a striker interconnected to the rear panel. The latch assembly is attached to the display portion.

11 Claims, 9 Drawing Sheets

SPARE TIRE LICENSE PLATE MOUNTING SYSTEM FOR A MOTOR VEHICLE

This application claims priority to the provisional application filed Jan. 11, 2000 having Ser. No. 60/175,541.

BACKGROUND OF THE INVENTION

1. Technical Field

The present invention generally pertains to motor vehicles. More particular, the present invention pertains to a spare tire and license plate mounting system for a motor vehicle having a swing-away license plate carrier. More specifically, but without restriction to the particular embodiment and/or use which is shown and described for purposes of illustration, the present invention relates to a spare tire and license plate mounting system having a latch assembly for releasing/securing a swing-away license plate carrier.

2. Discussion

It is well known in the motor vehicle field to mount a spare tire to a rear panel. This spare tire mounting technique is commonly employed for sport utility vehicles and the like which do not have a conventional trunk for storage. By mounting the spare tire to the exterior surface of a rear gate, the interior of the vehicle is not encumbered by the tire. Additionally, access problems associated with mounting the spare tire to an underside of the frame are avoided.

Mounting of a spare tire to the gate presents two concerns. First, the area for mounting of a license plate is effectively reduced. This concern becomes particularly problematic in view of today's global marketplace. In this regard, it is desirable that a motor vehicle accommodate all export license plate sizes and satisfy homologation requirements. Secondly, a rear mounted spare tire may detract from vehicle styling. Thus, in addition to providing a suitable area for license plate mounting, it is also desirable to at least partially conceal the spare tire and thereby present an improved aesthetic appearance while retaining easy access to the spare tire.

One arrangement for mounting a spare tire and license plate to a motor vehicle is shown and described in commonly assigned U.S. Ser. No. 09/121,622, entitled License Plate Carrier for a Motor Vehicle, and filed Aug. 10, 1998. U.S. Ser. No. 09/121,622, which is hereby incorporated by reference as is fully set forth herein, discloses an arrangement including a bracket fixedly attached to a rear surface of the motor vehicle and a license plate carrier pivotally connected to the bracket for rotation about a pivot axis. The license plate carrier includes a display portion oriented in a substantially vertical plane and spaced from the rear surface of the motor vehicle. A plurality of threaded shafts rearwardly extend from the tire mounting member for mounting the spare tire thereto. The license plate carrier includes a boss portion for receiving one of the threaded shafts to thereby selectively prevents rotation of the license plate carrier about the pivot axis.

It remains desirable in the art to provide a swing-away license plate carrier with a latching arrangement for releasing/securing the carrier relative to a body of a motor vehicle.

SUMMARY OF THE INVENTION

It is a general object of the present invention to provide a spare tire and license plate mounting system including a manually operated latch for releasing/securing a swing-away license to a body of a motor vehicle.

In one form, the present invention provides an apparatus for mounting a license plate to a motor vehicle having a spare tire mounted to a rear panel. The apparatus includes a mounting portion, a display portion and a latch assembly. The mounting portion is adapted to be pivotally interconnected to the motor vehicle for rotation about a pivot axis to selectively provide access to the spare tire. The display portion is carried by the mounting portion and is adapted to be oriented in a substantially vertical plane and spaced apart from a rear surface of the motor vehicle such that the spare tire is mounted to the motor vehicle interbetween the rear surface and the display portion. The latch assembly is operative for releasing/engaging a striker interconnected to the rear panel. The latch assembly is attached to the display portion.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
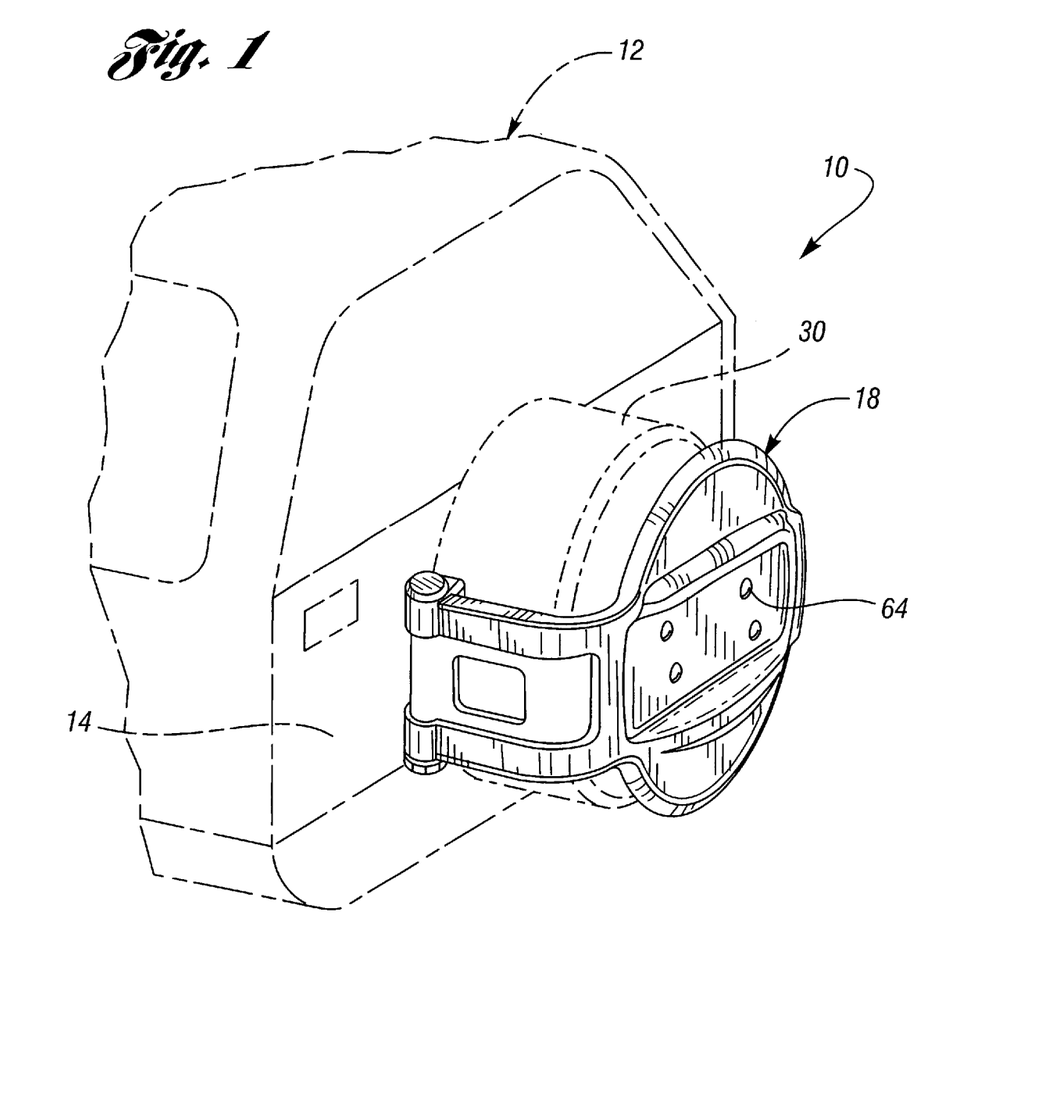
FIG. 1 is a perspective view illustrating a spare tire and a license plate mounting arrangement constructed in accordance with the teaching of a preferred embodiment of the present invention operatively installed on a motor vehicle.

With initial reference to the environmental view of FIG. 1, a system for mounting a spare tire and a license plate to a motor vehicle constructed in accordance with the teachings of a preferred embodiment of the present invention is generally identified with reference numeral 10. The system 10 of the present invention is shown operatively associated with a motor vehicle 12 having a rear gate 14. It will be understood by those skilled in the art that the particular vehicle 12 shown is merely exemplary and that the teachings of the present invention have applicability to a wide range of vehicles.

With continued reference to FIG. 1, and additional reference to FIGS. 2–9, the system of the present invention is shown to generally include a tire mounting member 16 and a license plate carrier 18. As particularly shown in FIG. 2, the tire mounting member 16 includes a mounting portion 20 and a longitudinally extending portion 22. The mounting portion 20 is provided with a plurality of apertures 24 for receiving fasteners (not specifically shown). The fasteners function to secure the mounting member 16 to the gate 14. Alternatively, it will be understood that the mounting member 16 may be welded or otherwise suitably secured to the gate 14.

Figure 2:
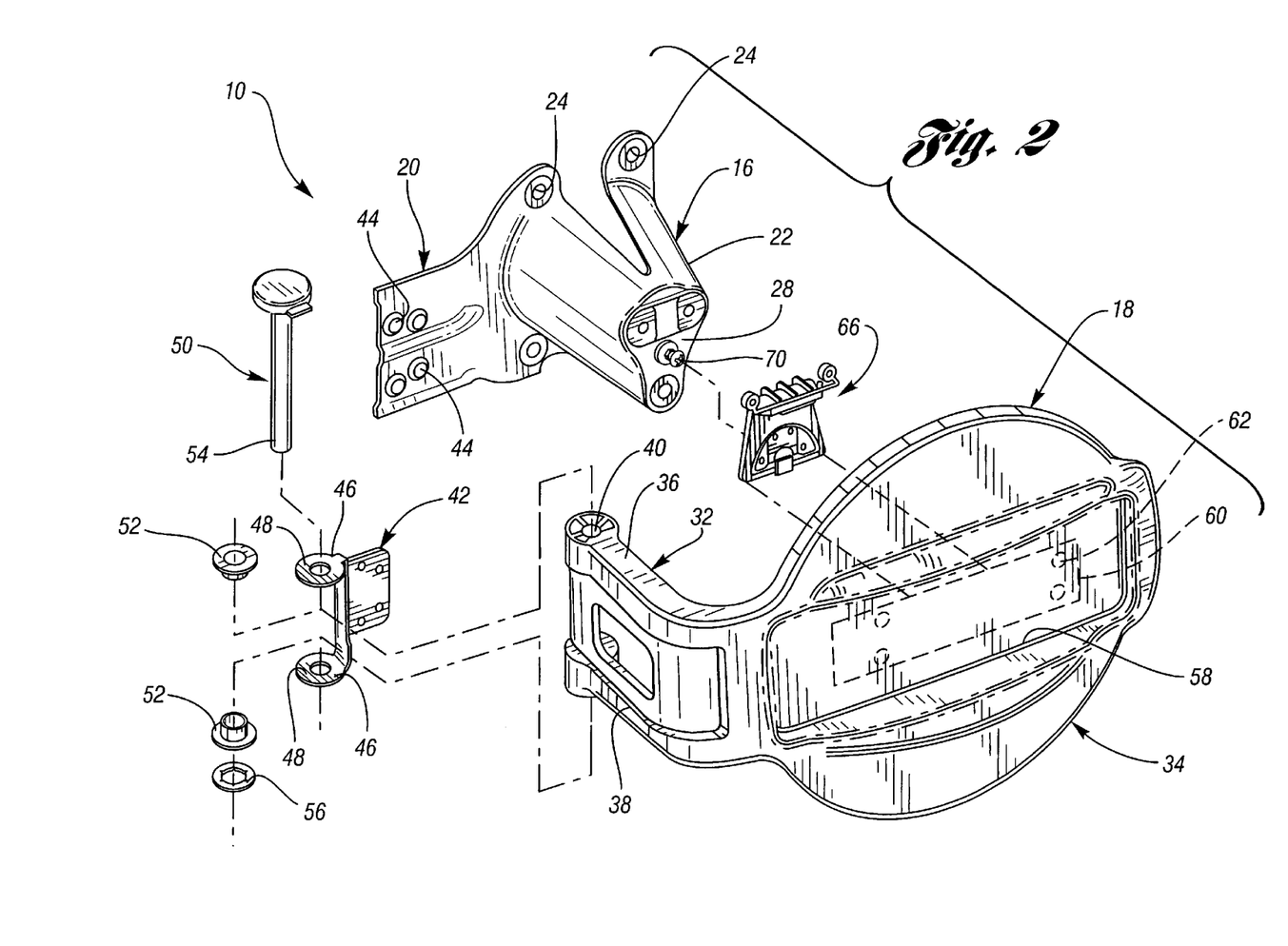
FIG. 2 is an enlarged exploded view illustrating the spare tire and license plate mounting arrangement constructed in accordance with the teachings of a preferred embodiment of the present invention.
Figure 3:
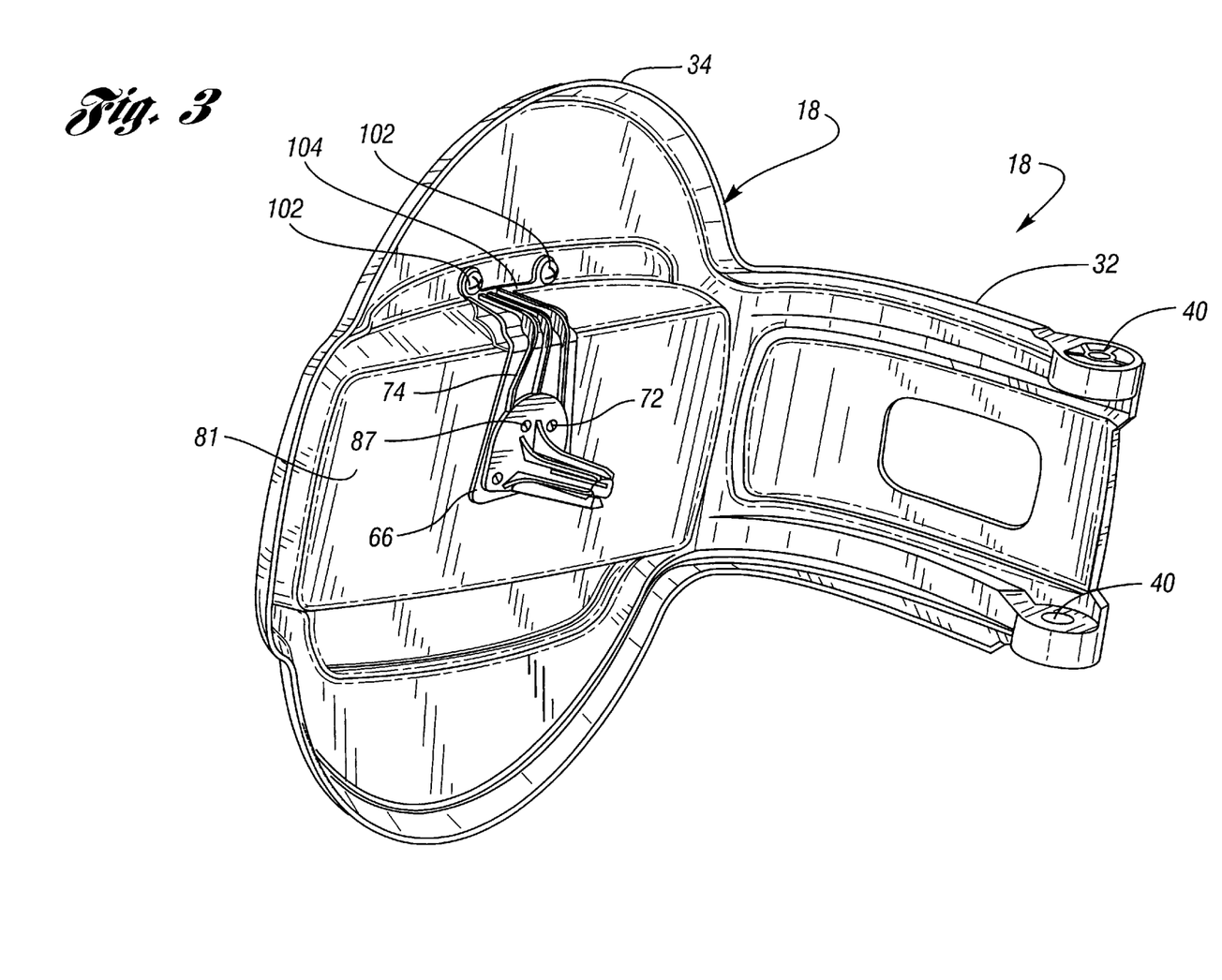
FIG. 3 is a rear perspective view a swing-away license plate carrier of the present invention.

The longitudinally extending portion 22 of the mounting member 16 includes a generally cylindrical wall which tapers slightly in a rearward direction and terminates at a face 28. The face 28 is adapted to abut an inner surface of a wheel of a spare tier 30. The spare tire 30 may be secured to the mounting member 16 by a plurality of threaded shafts (not shown) extending therefrom. The particular manner of attachment of the spare tire 30 is beyond the scope of the present invention. However, one suitable manner is shown and described in commonly assigned U.S. Ser. No. 09/121, 622, now U.S. Pat. No. 6,098,855, referenced above.

The license plate carrier 18 is shown to generally include a mounting portion 32 oriented generally parallel to a longitudinal axis of the vehicle 12 and a display portion 34 oriented generally perpendicular to the mounting portion 32. In the preferred embodiment, the mounting portion 32 is illustrated to include first and second vertically spaced apart arms 36 and 38. To provide means for pivotally interconnecting the license plate carrier 18 with the motor vehicle 12, the first arm or upper arm 36 of the mounting portion 32 defines an aperture 40 vertically extending therethrough. The second arm or lower arm 38, defines a similar aligning aperture (not shown) passing therethrough. A pivot bracket 42 is secured to the mounting portion 20 of the mounting member 16 with a plurality of fasteners 44. The pivot bracket 42 defines a pair of horizontally oriented flanges 46 each having an aperture 48. The apertures 40 and 48 cooperate with the apertures 40 to receive a pivot pin 50. In this regard, the pivot pin 50 is received with bushings 52 press fit into the apertures 48. A lower end 54 of the pivot pin 50 is engaged by a Tinnerman clip 56. The pivot pin 50 defines a vertical pivot axis.

In the exemplary embodiment illustrated, the display portion 34 of the license plate carrier 18 has a generally circular overall shape with a diameter substantially equal to that of the spare tire 30. As a result, the display portion 34 conceals the spare tire 30 in rear view and provides an aesthetically improved appearance. The display portion 34 includes a central mounting area 58 to which a license plate 60 (in phantom lines in FIG. 2) is secured. The license plate 60 is secured in a conventional manner with threaded fasteners 62 which engage internally threaded apertures 64 (shown in FIG. 1).

To provide means for selectively preventing rotation of the license plate carrier 18 about the pivot axis defined by the pivot pin 50, the system 10 includes a latching arrangement, the latching arrangement includes a latch assembly 66 and a striker 70. As will become apparent below, the latch assembly 66 is attached to a rear surface 68 of the display portion 34 and is adapted to releasably engage the striker 70 which rearwardly extends from the face 28. In one application, the latch assembly 66 is constructed of glass filled nylon. However, it will be understood that alternative materials may be employed.

The latch assembly 66 is illustrated to generally include a first member 72 and a second member 74. The first member 72 includes a first portion 76 defining a socket 78 for receiving the striker 70 and acting as a stopper. The first member 72 further includes a second portion 80 which is secured to a rear surface 81 of the display portion 34. The first portion 76 includes a plurality of fingers 82A, 82B, 82C and 82D. In the exemplary embodiment, the plurality of fingers includes four FIGS. 82A–82D. An upper one of the FIG. 82A and side ones of the FIGS. 82B and 82C extend from the second portion 80 of the first member 72. A lower one 82D of the plurality of fingers is connected to both the side fingers 82B and 82C through a vertically extending segment 84 that act as fixed pivots.

The second portion 80 of the first member 72 as a generally half circle shape and defines a plurality of holes 86. The holes are adapted to receive fasteners 87 (shown in FIG. 3) for securely attaching the first member 72 to the rear surface 81 of the display portion 34.

The second member 74 includes a vertically extending portion 88, a horizontally extending portion 90 and a manually engageable handle portion 92. The second portion 80 of the first member 72 is disposed within a half circle opening 95 defined by the vertically extending portion 88. The lower finger 82 extends from a lower peripheral edge 94 of the vertically extending portion 88. In the exemplary embodiment illustrated, a metal reinforcing clip 96 connects the lower peripheral edge 94 and the lower finger 82D.

Figure 5:
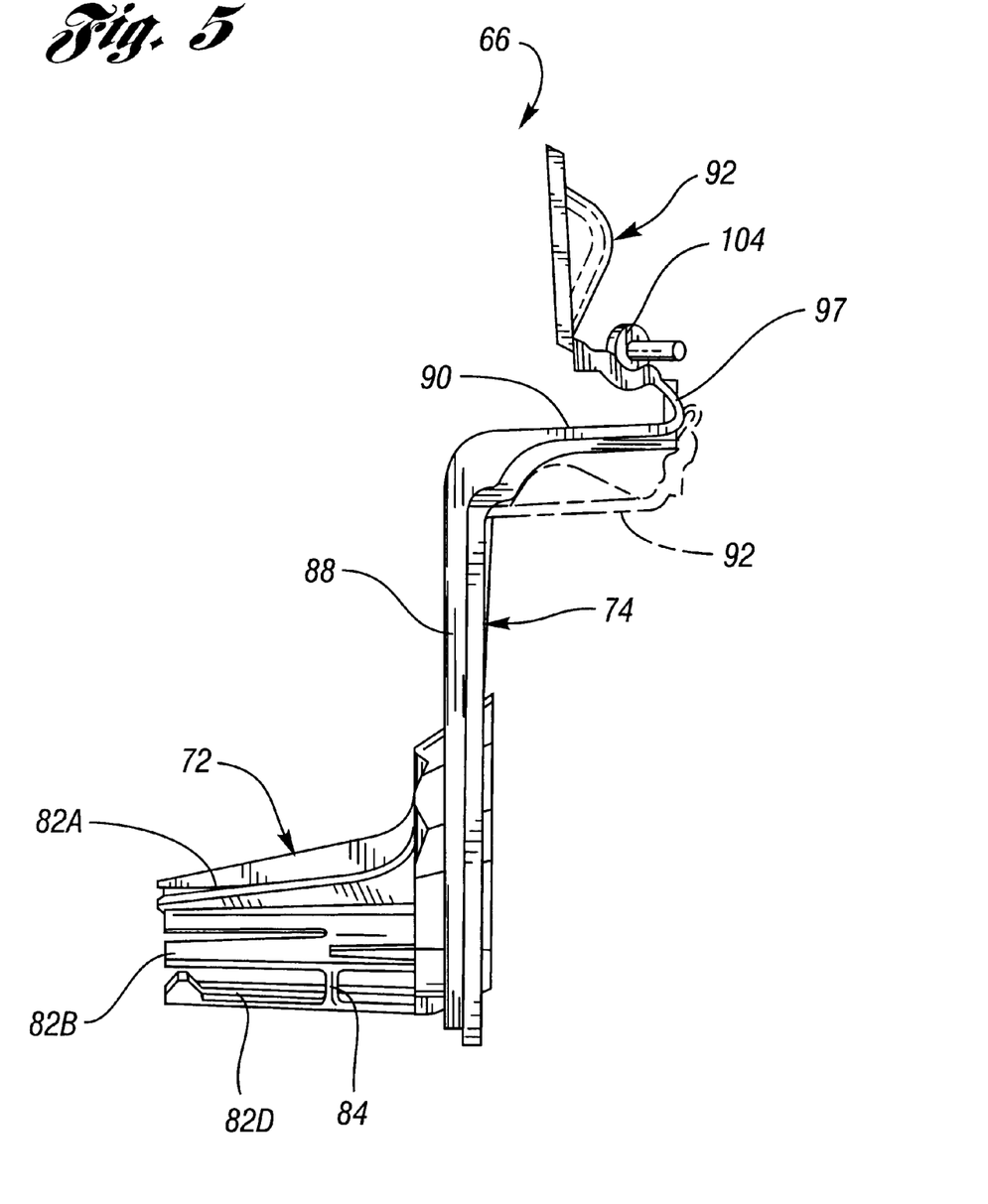
FIG. 5 is a side view of a latch assembly of the present invention illustrated in the position in which the latch assembly is molded.
Figure 6:
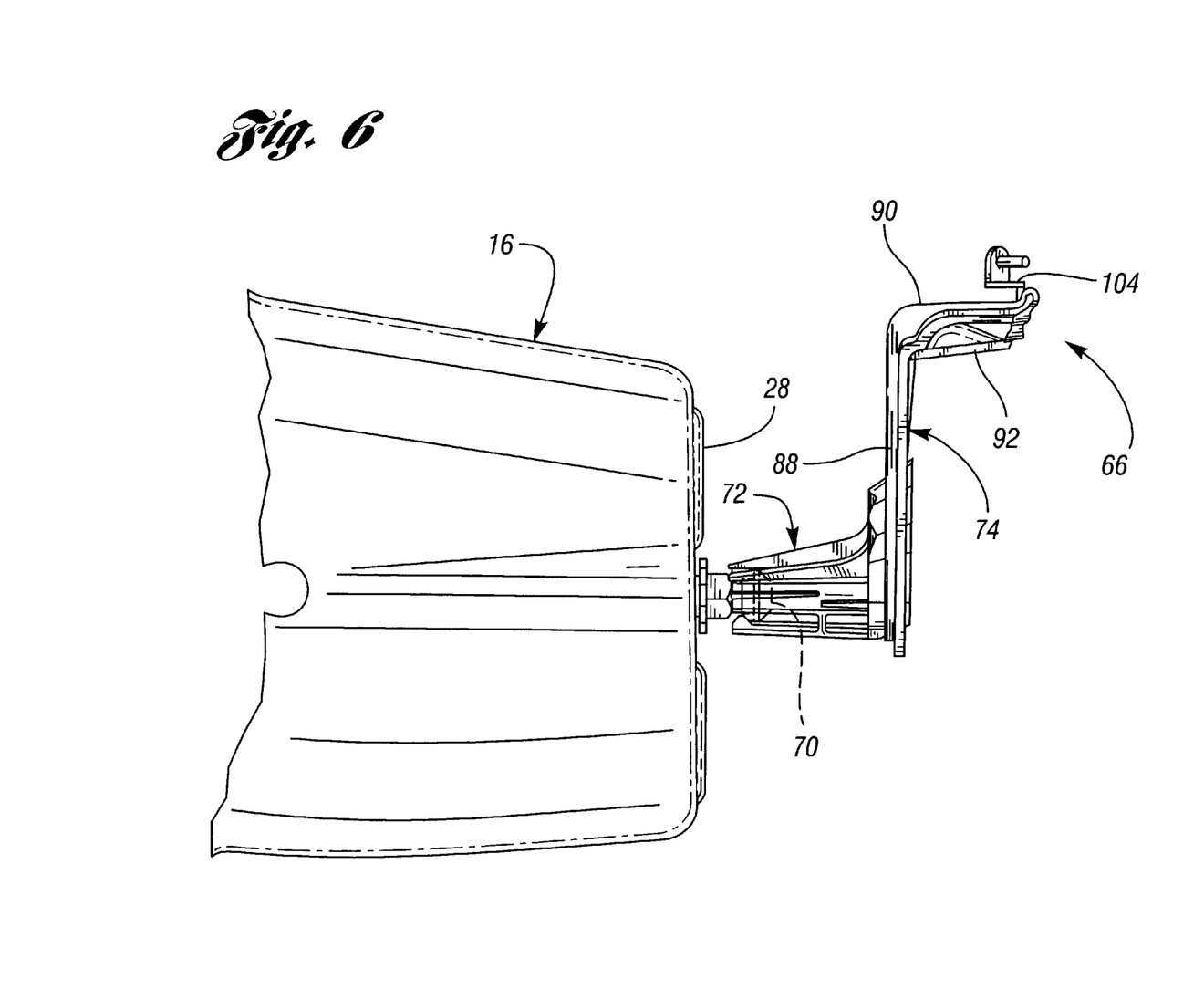
FIG. 6 is a side view of the latch assembly of the present invention operatively engaged with a striker, the socket portion shown in an engaged position.
Figure 7:
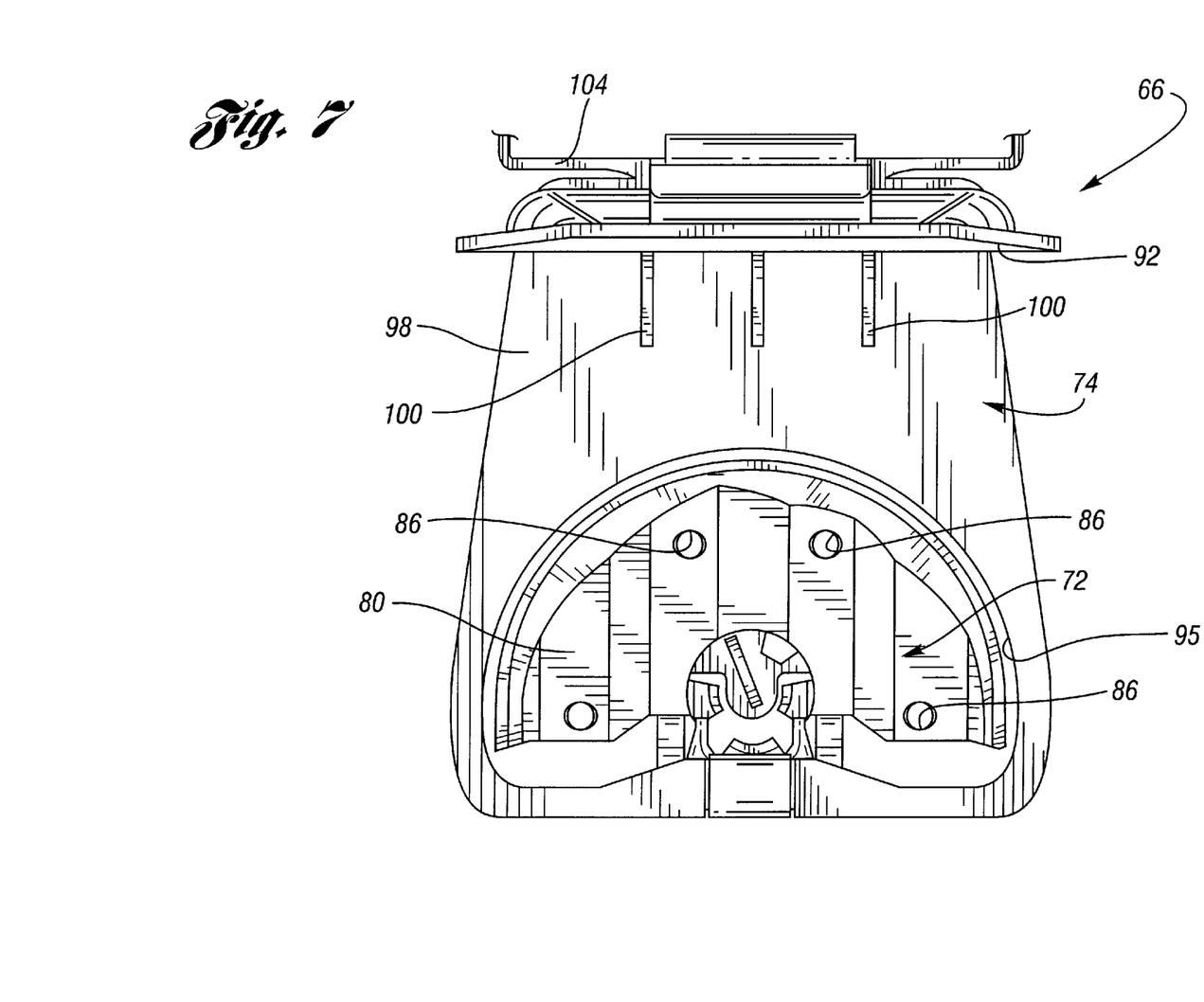
FIG. 7 is a rear view of the latch assembly of the present invention shown.
Figure 8:
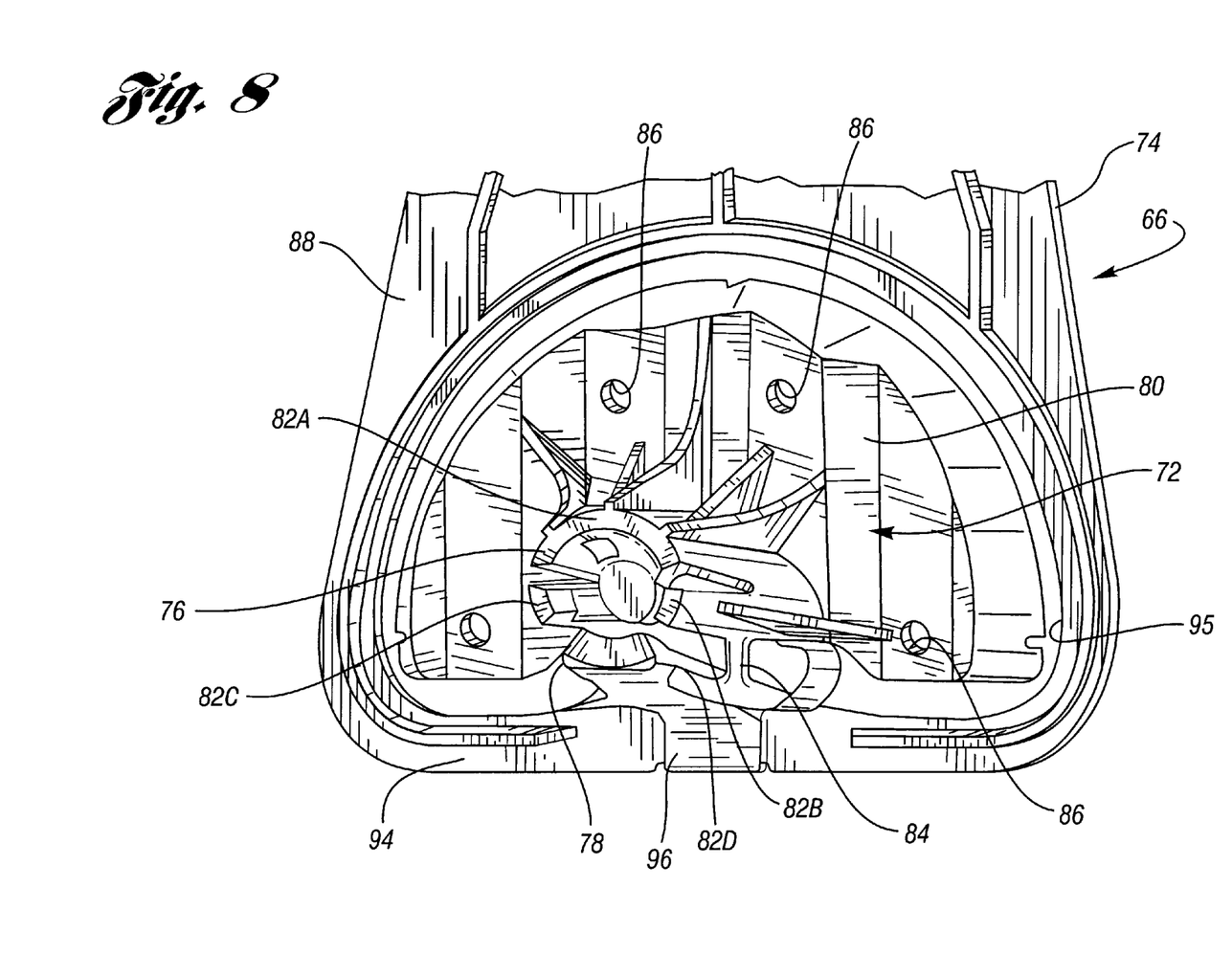
FIG. 8 is an enlarged front and side perspective view of a portion of the latch assembly of the present invention.
Figure 9:
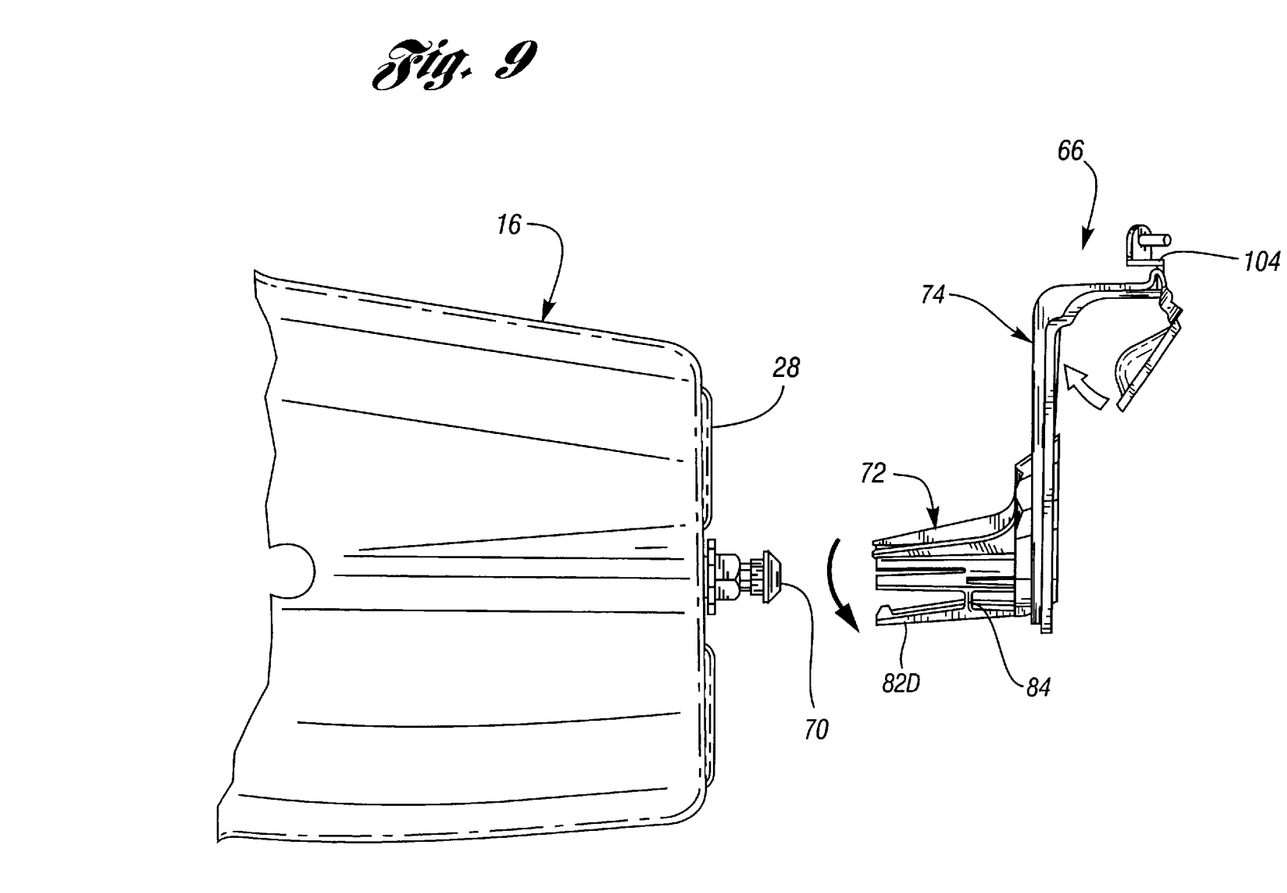
FIG. 9 is a side view similar to FIG. 6, illustrating the latch assembly displaced form the striker and with the socket portion shown in a release position.

The manually engageable handle 92 is connected to the horizontally extending portion 90 through a living hinge 97. In FIG. 5, the latch assembly 66 is illustrated in solid lines in the position in which it is uniformly molded. In phantom lines, FIG. 5 illustrates the manually engageable handle 92 in its operative position. As specifically shown in FIG. 7, a rear surface 98 of the vertically extending portion 88 is formed to include a plurality of ribs 100 which function to retain the manually engageable handle 92 in its operative position.

In the exemplary embodiment, the second member 74 is attached to the rear surface 81 of the display portion 34 by a pair of fasteners 102. The fasteners pass through apertures (not specifically shown) provided in a mounting portion 104 formed with the horizontally extending portion 90. It will be understood that other manners of attachment may be alternatively employed.

Figure 4:
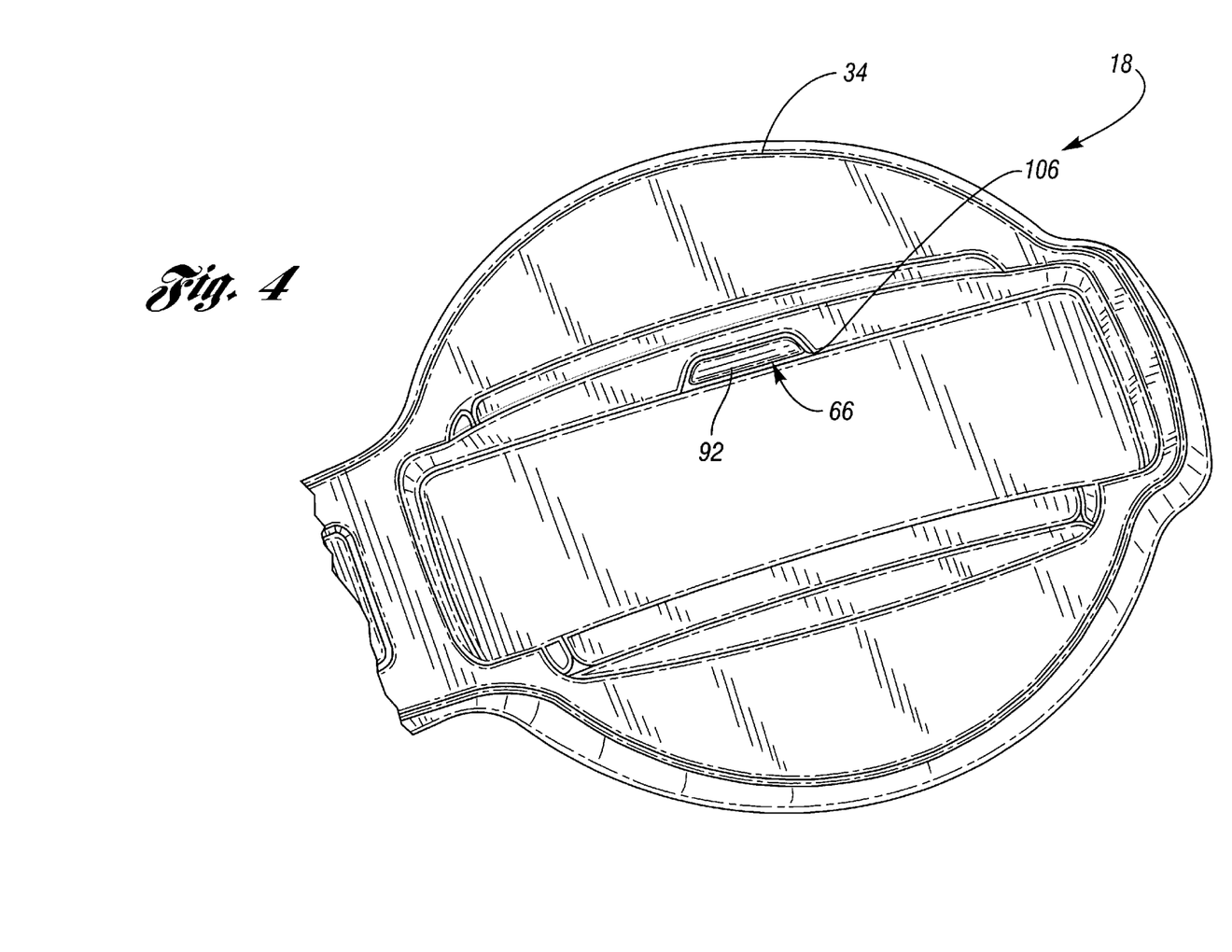
FIG. 4 is a front and bottom perspective view of the swing-away license plate carrier of the present invention.

With particular reference to FIG. 4, the manually engageable handle 92 is shown accessible through an opening 106 provided in the display portion 34. In operation, a manual force upwardly applied to the manually engageable handle 92 functions to upwardly translate the vertically extending portion 88 and thereby cantilever the lower finger 82D about the vertically extending segments 84 that act as fixed pivots. As a result, the socket 78 defined by the plurality of the fingers 82A–82D enlarges sufficiently to permit the striker 70 to be released from the socket 78. In this regard, the first portion 76 of the first member 72 is selectively operable in a striker retention mode (shown specifically in FIG. 6) and a striker release mode (shown specifically in FIG. 9) in response to upwardly translation of the vertically extending portion 88 of the second member 74.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An apparatus for mounting a license plate to a motor vehicle having a spare tire mounted to a rear panel, the apparatus comprising:
    a mounting portion adapted to be pivotally connected to the motor vehicle for rotation about a pivot axis to selectively provide access to the spare tire;
    a display portion carried by the mounting portion, the display portion oriented in a substantially vertical plane and spaced apart from a rear surface of the motor vehicle such that the spare tire is mounted to the motor vehicle between the rear surface and the display portion; and
    a latch assembly for releasing/engaging a striker connected to the rear panel, the latch assembly attached to the display portion and comprising a first member sharing a plurality of fingers which define a socket for receiving the striker.

2. The apparatus of claim 1, wherein a lower finger of the plurality of fingers extends from a second member.

3. The apparatus of claim 2, wherein the first member is selectively operative in a striker retention mode and a striker release mode in response to movement of the second member.

4. The apparatus of claim 2, wherein the lower finger is pivotally connected to one or more of the other fingers of the plurality of fingers such that movement of the second member in an upward direction operates to release the striker from the socket.

5. A system for mounting a spare tire and a license plate to a motor vehicle, the system comprising:
    a tire mounting member including a bracket adapted to be fixedly attached to a rear surface of the motor vehicle;
    a license plate carrier pivotally connected to the bracket for rotation about a pivot axis, the license plate carrier including a display portion adapted to be oriented in a substantially vertical plane and spaced from the rear surface of the motor vehicle; and
    a latch assembly for releasing/engaging a striker interconnected to the tire mounting member, the latch assembly attached to the display portion and comprising a first member having a plurality of fingers which define a socket for receiving the striker.

6. The system of claim 5, wherein a lower finger of the plurality of fingers extends form a second member.

7. The system of claim 6, wherein the first member is selectively operative in a striker retention mode and a striker release mode in response to movement of the second member.

8. The system of claim 6, wherein the lower finger is pivotally connected to one or more of the other fingers of the plurality of fingers such that movement of the second member in an upward direction operates to release the striker from the socket.

9. A motor vehicle a comprising:
    a rear panel;
    a tire mounting member fixedly attached to a gate;
    a license plate carrier including a display portion oriented in a vertical plane and horizontally spaced from the gate, the license plate carrier pivotally connected to the rear panel for orientation about a vertical pivot axis, and
    a lathing arrangement for releasing/retaining the license plate carrier relative to the gate, the latching arrangement including:
        a striker extending from the tire mounting, member, and
        a latch assembly remember arranged to releasably engage the striker, the latch assembly attached to the display portion, wherein the latch assembly member includes a plurality of fingers which define a socket for receiving the striker.

10. The motor vehicle of claim 9, wherein a lower finger of the plurality of fingers extends from a second member.

11. The motor vehicle of claim 10, wherein the latch assembly member is selectively operative in a striker retention mode and a striker release mode in response to movement of the second member.

\* \* \* \* \*